United States Patent [19]

Miura

[11] Patent Number: 5,400,190

[45] Date of Patent: Mar. 21, 1995

[54] POWER SAVING SYSTEM FOR A DISK SENSOR IN ROTATING DISK DATA STORAGE APPARATUS

[75] Inventor: Tohru Miura, Chofu, Japan

[73] Assignee: Teac Corporation, Tokyo, Japan

[21] Appl. No.: 71,817

[22] Filed: Jun. 4, 1993

[30] Foreign Application Priority Data

Jun. 12, 1992 [JP]  Japan .................................. 4-178985

[51] Int. Cl.⁶ .......................................... G11B 15/18
[52] U.S. Cl. ........................................ 360/69; 360/71;
360/97.01; 369/53
[58] Field of Search ................ 360/69, 97.01, 99.01,
360/137, 71; 369/53

[56] References Cited

U.S. PATENT DOCUMENTS

| | | | |
|---|---|---|---|
| 4,626,942 | 12/1986 | Shoji et al. | 360/99.01 |
| 4,658,307 | 4/1987 | Tsuyuguchi et al. | 360/69 |
| 4,677,510 | 6/1987 | Shoji et al. | 360/99.12 |

Primary Examiner—Andrew L. Sniezek
Attorney, Agent, or Firm—Woodcock Washburn Kurtz Mackiewicz & Norris

[57] ABSTRACT

A flexible magnetic disk drive incorporates a system for reducing the power consumption of a disk sensor according to a power save signal which is supplied from a host system and which indicates whether the disk drive is active or inactive. The disk sensor has a switch connected in series with a resistor, the sensor switch being opened or closed depending upon whether a flexible magnetic disk cartridge is loaded in or unloaded from the disk drive. For powering the disk sensor at least when the disk drive is active, and for unpowering the same when the disk cartridge is unloaded while the disk drive is inactive, an OR gate is provided which has its output grounded via the sensor switch and the resistor, one of its two inputs connected to the power save signal line, and the other input to a circuit point between sensor switch and resistor. Thus the OR gate goes low upon unloading of the disk cartridge while the disk drive is inactive, so that there is no current flow through the resistor even though the sensor switch is then closed. Additional embodiments are disclosed.

11 Claims, 7 Drawing Sheets

POWER SAVING SYSTEM FOR A DISK SENSOR IN ROTATING DISK DATA STORAGE APPARATUS

BACKGROUND OF THE INVENTION

This invention relates to apparatus for data transfer with a replaceable, rotating magnetic disk, particularly a flexible magnetic disk which normally is packaged in cartridge form. More particularly, the invention pertains to a system for saving power consumed by a disk sensor incorporated in such rotating disk data storage apparatus for sensing the loading and unloading of a disk, or a disk cartridge, in and from the apparatus.

Various power saving schemes have been suggested and used with floppy disk drives. Among such conventional suggestions is that described and claimed in U.S. Pat. No. 4,658,307 filed by Tsuyuguchi et al. and assigned to the assignee of the instant application. Tsuyuguchi et is al. teaches to connect the disk motor drive circuit, head motor drive circuit and read/write circuit, all standard components of the disk drive, to a power supply via a power saving switch. This switch is closed only when a disk sensor, another standard component, senses the loading of the floppy disk cartridge in the disk drive, or when the "drive select" and "motor on" signals from the host system, under which control the disk drive operates, are in prescribed states. The motor drive circuits and read/write circuit are therefore not powered in the absence of the disk cartridge, or when the "drive select" and "motor on" signals are in other than the prescribed states, even if the complete data processing system, comprising the host and one or more disk drives, is powered on. A very substantial saving of power can thus be accomplished.

As far as the applicant is aware, however, no power saving measure was conventionally taken for the disk sensor itself. In exploring the possibilities of reducing the waste of power by the disk sensor, the applicant has paid attention to the information that is contained in control an data fed from some host systems and which indicates whether the disk as drive is active or inactive, that is, whether the disk drive is to be, or being, put to reading or writing, or is just standing by. This information will be hereinafter referred to as the power save signal as various power consuming components of the disk drive have proved to be capable of being held unpowered when the signal indicates standby.

The trouble with the disk sensor is that it is totally unpredictable just when the disk will be loaded in, and unloaded from, the disk drive, the loading and unloading of the disk being purely at the will of the user. Whenever the disk was unloaded, the disk sensor circuit of conventional design immediately signaled the host system to that effect. For this reason a voltage was held applied to the disk sensor as long as the data processing system was powered on.

Consider a disk sensor circuit comprising a serial connection of a sensor switch, which is turned on or off depending upon whether the disk is loaded in or unloaded from the disk drive, and a resistor. A current flowed through the resistor as long as the sensor switch remained closed, as when the disk was not loaded, with the consequent loss of power. Now that the power requirements of other power consuming parts of the disk drive have been reduced to a minimum, and with the advent of battery powered disk drives, the saving of power consumed by the disk sensor has become imperative in view of strong, consistent demands from the users for less power consuming disk drives.

SUMMARY OF THE INVENTION

The present invention aims at the provision of a novel power saving system for a disk sensor in rotating disk data storage apparatus of the kind defined.

Briefly, the invention is directed to an apparatus for data transfer with a rotating data storage disk to be loaded in and unloaded from the apparatus. More particularly, the invention provides a power saving system comprising power save signal means for providing a power save signal indicative of whether the apparatus is active or inactive, and disk sensor means comprising a serial connection of a sensor switch and a resistor, the sensor switch being opened or closed depending upon whether the data storage disk is loaded in or unloaded from the apparatus. Also included are power supply means for holding the disk sensor means powered at least when the apparatus is active, and for unpowering the disk sensor means when the disk is unloaded while the apparatus is inactive. The power supply means include a logic gate having a first input connected to the power save signal means, a second input connected to a circuit point between the sensor switch and the resistor of the disk sensor means, and an output which is either grounded or connected to a positive supply terminal via the serial connection of the sensor switch and the resistor.

Typically, the logic gate is an OR gate in the form of a complementary metal oxide semiconductor integrated circuit. The OR gate has its output grounded via the serial connection of the resistor and the sensor switch. The OR gate is high at least when the apparatus is active, thereby powering the disk sensor means. However, if the disk cartridge is unloaded while the apparatus is inactive, the OR gate goes low, so that there is not current flow through the resistor despite the closure of the sensor switch.

Additional embodiments are disclosed in which the logic gate takes the form of various other devices. In one such embodiment an AND gate is employed which is connected to a positive supply terminal, instead of being grounded, via the disk sensor means. In this case, too, no current flows through the resistor from the supply terminal when the disk cartridge is unloaded while the apparatus is inactive.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENTS

Figure 1:
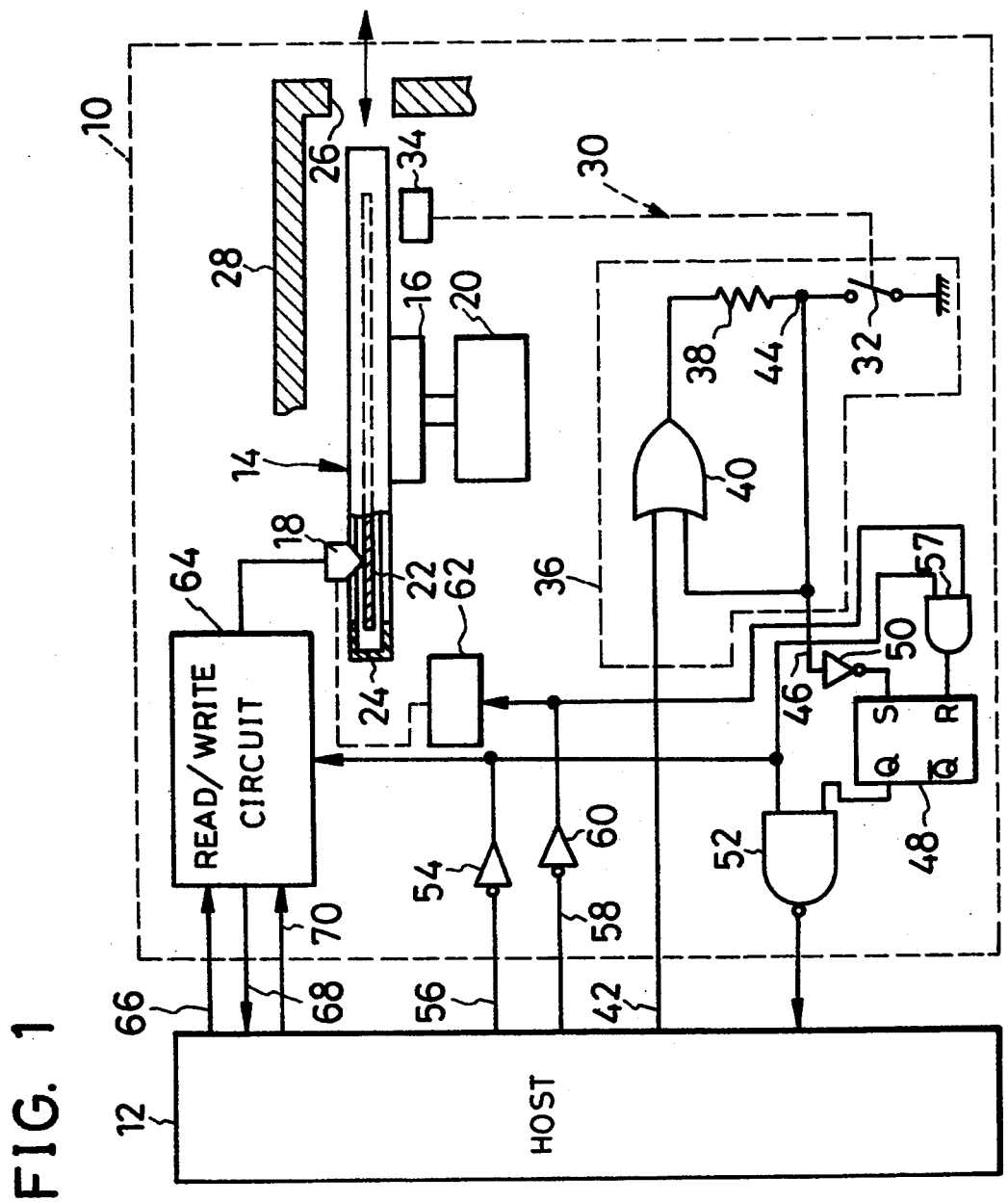
FIG. 1 is a combined pictorial and block diagrammatic illustration of a flexible magnetic disk drive incorporating the disk sensor power saving system of the invention, the disk drive being shown together with a host system.

The invention will now be described in detail as embodied in a disk drive for use with flexible magnetic disk cartridges having disks of three and a half inch diameter, one of the standard disk sizes. FIG. 1 shows such a disk drive 10 together with a host system 12. The disk drive 10 is shown to have a flexible magnetic disk cartridge 14 loaded in position on a turntable 16 for data transfer with a magnetic read/write head or transducer 18. An electric disk drive motor 20 is coupled directly to the turntable 16 for imparting rotation thereto.

Having a disk 22 rotatably housed in a protective envelope 24, the disk cartridge 14 is inserted in the disk drive 10 through a slot 26 in its casing 28 and positioned on the turntable 16 as a permanent magnet, not shown, on the turntable attracts the metal made hub, also not shown, of the disk. It is also understood that the turntable has a spindle for centering engagement in a central opening in the disk hub, and a drive pin for driving engagement in an eccentric opening in the disk hub, so that the disk rotates with the turntable by being merely positioned thereon.

At 30 is seen a disk sensor for sensing whether the disk cartridge 14 is loaded on the turntable 16. In practice the disk sensor 30 may take the form of a Microswitch (trade name) comprising a normally as closed contact pair 32 and a switch actuator 34. The contact pair 32, hereinafter referred to as the sensor switch, is to turn off when the switch actuator 34 is depressed by the disk cartridge 14 loaded on the turntable 16, and on when the cartridge is unloaded.

In order to obtain a signal indicative of whether the sensor switch 32 is open or closed, that is, whether the disk cartridge is loaded or unloaded, there is provided a sensor circuit 36 which is shown to comprise a resistor 38 and an OR gate 40 in addition to the sensor switch 32. This sensor switch 32 is grounded on one hand and, on the other hand, connected to the output of the OR gate 40 via the resistor 38. The OR gate 40 has a first input connected to the host 12 for inputting a POWER SAVE signal therefrom over a line 42, and a second input connected to a circuit point 44 between sensor switch 32 and resistor 38, thereby forming a feedback loop.

Preferably, for minimal power consumption, the OR gate 40 should be of the known complementary metal oxide semiconductor (CMOS) construction comprising insulated gate field effect transistors in integrated circuit form. The CMOS OR gate is connected to its own supply terminal which is not shown according to common practice in drawing electrical diagrams.

The POWER SAVE signal from the host 12 is high when writing or reading is to be conducted in the disk drive 10, and low when no such operation is to be conducted. Thus the POWER SAVE signal serves to indicate whether the disk drive can be in power saving mode or should be in nonpower saving mode. Optionally, however, the standard DRIVE SELECT signal, indicative of whether this disk drive is chosen for operation, or MOTOR ON signal, indicative of whether the disk drive motor is to be set in or out of operation, could be utilized in lieu of the POWER SAVE signal, so that the DRIVE SELECT and MOTOR ON signals are considered essentially equivalent to the POWER SAVE signal for the purposes of this invention.

The sensor circuit 36 has an output line 46 connected to the noted circuit point 44. Besides being connected to the OR gate 40 as aforesaid, the output line 46 is connected to the set input S of a flip flop 48 via a NOT circuit or inverter 50. The noninverting output Q of this flip flop is connected to a NAND gate 52, which has another input connected via a NOT circuit 54 to the host 12 for receiving the DRIVE SELECT signal over a line 56. The output of the NAND gate 52 is coupled to the host 12. The output signal of the disk sensor circuit 36 is therefore delivered to the host 12 only when the DRIVE SELECT signal is low, commanding the operation of the disk drive 10.

The flip flop 48 has its reset input R connected to an AND gate 57. This AND gate has an input connected to the DRIVE SELECT line 56 via the NOT circuit 54, and another input connected to a stepping pulse line 58 via another NOT circuit 60. The stepping pulse line 58 is also connected to a transducer positioning mechanism 62 of conventional design comprising an electric stepper motor which, in response to the stepping pulses, rotates by small increments for moving the transducer 18 from track to track on the disk 22. The stepping pulses are utilized in this particular embodiment for resetting the flip flop 48, although any other appropriate signal could be employed to this end.

The transducer 18 is connected to a known read/write circuit 64 which is connected to the host 12 via WRITE DATA line 66, READ DATA line 68, WRITE GATE line 70, and DRIVE SELECT line 56 having the NOT circuit 54. The primary functions of the read/write circuit 64 are to process the incoming WRITE DATA into a form suitable for writing on the disk 22 by the transducer 18, and to reconstruct the READ DATA from the output from the transducer 18. Actually, there are many other signal lines between disk drive 10 and host 12. All such additional signal lines, as well as the necessary interface between disk drive and host, are not shown because of their impertinence to the present invention.

Operation

Figure 2:
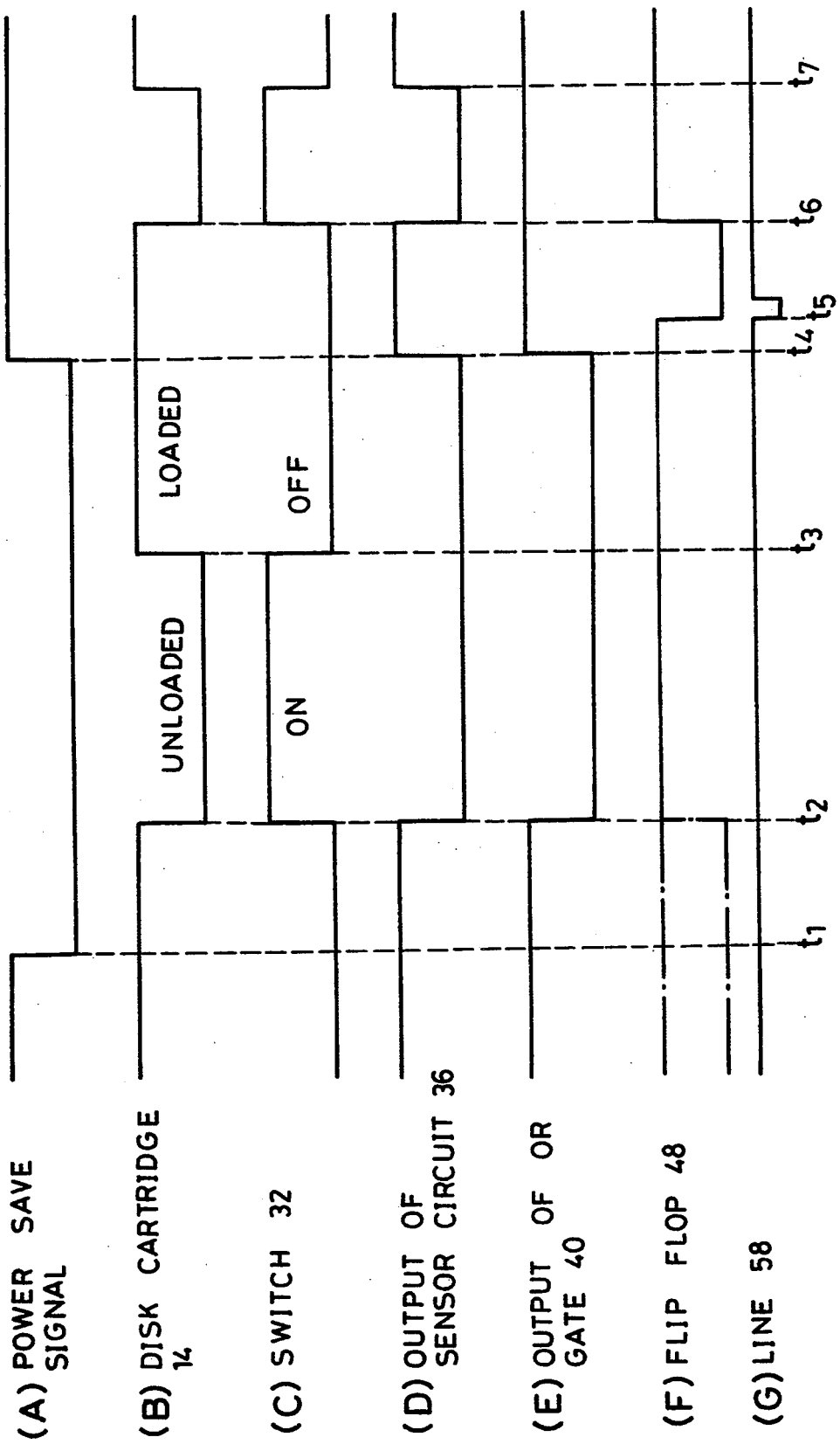
FIG. 2, consisting of (A) through (G), is a timing chart explanatory of the operation of the FIG. 1 power saving system.

FIG. 2 shows the signals appearing in various parts of the FIG. 1 system for the ease of understanding how the disk drive 10 operates to reduce the power requirement of the disk sensor circuit 36. Let it be assumed that the POWER SAVE signal on the line 42 is high until time $t_1$, as at (A) in FIG. 2, indicating that the disk drive 10 should be in nonpower saving mode, and that the disk cartridge 14 is held loaded on the turntable 16 until time $t_2$, later than the time $t_1$, as at (B) in FIG. 2. The sensor switch 32 will be open as long as the disk cartridge is loaded, as at (C) in FIG. 2.

Since the POWER SAVE signal is assumed to be high until time $t_1$ as above, the OR gate 40 of the disk sensor circuit 36 will also be high until this time, as at (E) in FIG. 2, regardless of whether the sensor switch 32 is open or closed. The sensor switch 32 is now assumed to be open, and the OR gate 40 to be high, so that the output from the disk sensor circuit 36 will be high, as at (D) in FIG. 2.

The POWER SAVE signal is shown to go low at the time h, indicating that the disk drive 10 can be in power saving mode. However, the disk cartridge 14 is still on the turntable 16, holding the sensor switch 32 open as at (C) in FIG. 2, so that the OR gate 40 will remain high, as at (E) in FIG. 2. Thus the output from the disk sensor circuit 36 will remain high, as at (D) in FIG. 2, as long as the disk cartridge 14 stays on the turntable 16.

The sensor switch 32 will become closed when the disk cartridge 14 is unloaded at the time $t_2$. With the circuit point 44 thus grounded, the output from the sensor circuit 36 will go low, as at (D) in FIG. 2. The flip flop 48 will become set at the time $t_2$ if it has been reset before this time, and will remain set if it has been set, as indicated at (F) in FIG. 2. Therefore, in the case where the flip flop 48 has been set before the time $t_2$, the host 12 will not be informed of the withdrawal of the disk cartridge 14 when the disk drive is in power saving mode. However, the host will be infallibly informed if the disk cartridge is unloaded when the disk drive is in nonpower saving mode, as will become apparent as the description proceeds.

The OR gate 40 will go low upon grounding of the circuit point 44 at the time $t_2$, as at (E) in FIG. 2, since then the POWER SAVE signal is also low. Consequently, no current will flow through the resistor 38, so that no power is to be wasted despite the closure of the sensor switch 32 during the power saving period.

At (B) in FIG. 2 is it indicated that the disk cartridge is reloaded on the turntable 16 at time is, when the POWER SAVE signal is shown to be still low. Thereupon the sensor switch 32 will open, as at (C) in FIG. 2. However, the OR gate 40 has been low before the time $t_3$, and so has been the POWER SAVE signal, so that the OR gate 40 will remain low despite the opening of the sensor switch 32. Thus the sensor circuit 36 will be unresponsive to the reloading of the disk cartridge at the time $t_3$. This is because the host 12 need not know the moment the disk cartridge is loaded during any power saving period in the illustrated embodiment.

However, when the POWER SAVE signal goes high at time $t_4$ and so indicates the nonpower saving mode, the OR gate 40 will go high, as at (E) in FIG. 2, and so will the output from the disk sensor circuit 36, as at (D) in FIG. 2, the sensor switch 32 being now open. As the POWER SAVE signal is shown to remain high after the time $t_4$, the OR gate 40 will continue the application of the normal operating voltage to the serial connection of sensor switch 32 and resistor 38.

Then, as the host 12 supplies a stepping pulse at time $t_5$, as at (G) in FIG. 2, over the line 58 for track seek operation of the transducer 18, the flip flop 48 will be thereby reset, as at (F) in FIG. 2. The flip flop 48 when thus reset provides a signal indicative of the fact that 14 the disk cartridge is loaded. The disk cartridge is shown to be subsets unloaded at time $t_6$, as at (B) in FIG. 2, when the POWER SAVE signal is still high. The sensor switch 32 will then be closed, as at (C) in FIG. 2. Since then the output from the sensor circuit 36 will become low, the flip flop 48 will be set by the inversion of this low output and so go high, as at (F) in FIG. 2. Thus the host 12 will be informed of the withdrawal of the disk cartridge 14 during the nonpower saving period after the time $t_4$.

Thus, in this FIG. 1 embodiment, the serial circuit of the sensor switch 32 and resistor 38 becomes unpowered when the disk cartridge 14 is unloaded at the time $t_2$ during the $t_1$–$t_4$ power saving period, and is held unpowered until the end of that power saving period, instead of being held powered as in the prior art. However, during the subsequent nonpower saving period, the unloading of the disk cartridge at the time $t_6$ can be sensed, and the corresponding signal sent to the host, in the same way as the conventional disk sensor circuitry equipped with no power saving means.

Second Form

Figure 3:
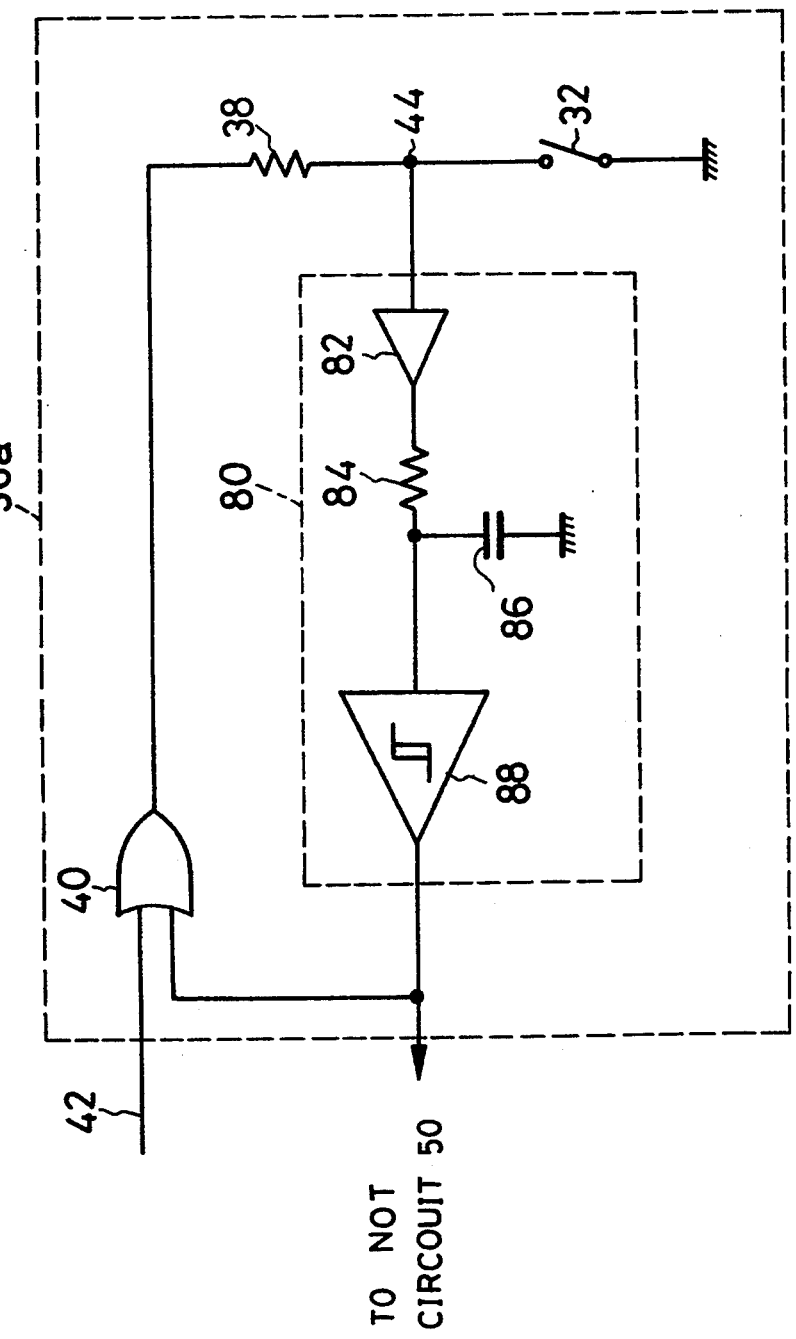
FIG. 3 is a schematic electrical diagram of a modified disk sensor circuit.

FIG. 3 shows a modified disk sensor circuit 36a for use in the FIG. 1 disk drive 10 in substitution for the first disclosed circuit 36. The alternative disk sensor circuit 36a features a noise suppressor circuit 80 inserted in the feedback loop of the sensor circuit. The noise suppressor circuit 80 includes a buffer amplifier 82 having its input connected to the circuit point 44 between disk sensor switch 32 and resistor 38. The output of the buffer 82 is connected to one extremity of a resistor 84, the other extremity of which is grounded via a capacitor 86 on one hand and, on the other hand, connected to a Schmitt circuit 88 having hysteresis. The Schmitt circuit 88 has its output connected to both OR gate 40 and NOT circuit 50. The other constructional details of the disk sensor circuit 36a are the same as set forth above in connection with the circuit 36.

The noise suppressor circuit 80, or its capacitor 86, functions to take up noise or transient voltage variations that may occur at the circuit point 44. Thus freed from noise, the output from the disk sensor circuit 36a will provide accurate indications of disk cartridge withdrawal during nonpower saving periods.

Third Form

Figure 4:
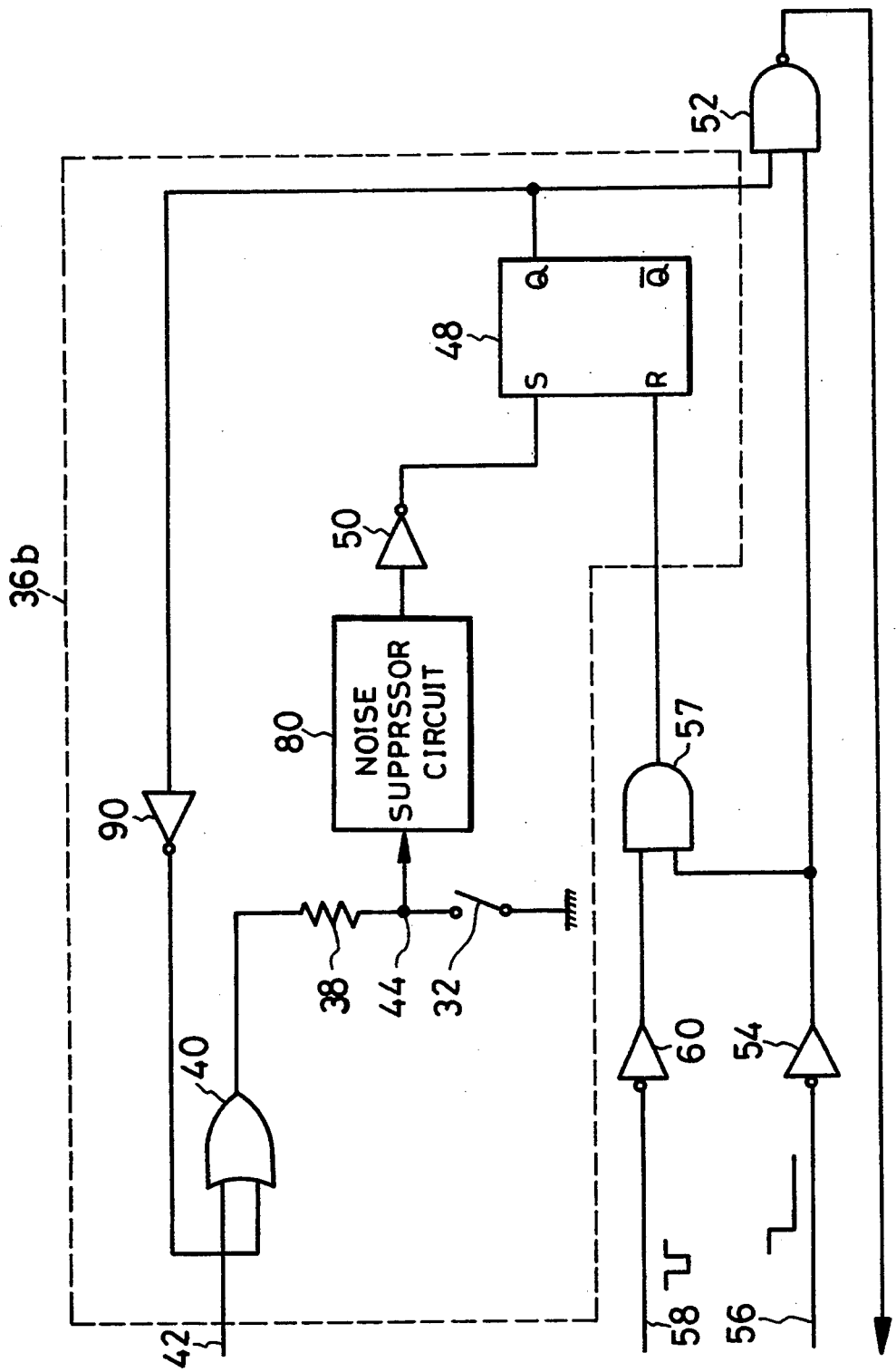
FIG. 4 is a schematic electrical diagram of another modified disk sensor circuit.

In FIG. 4 is shown another modified disk sensor circuit 36b together which is similar in construction to the FIG. 3 circuit 36a in having the noise suppressor circuit 80 but which differs therefrom in incorporating the flip flop 48 and NOT circuit 50 of the FIG. 1 disk drive 10 in its feedback loop. Constructed just like its FIG. 3 counterpart, the noise suppressor circuit 80 has its input connected to the circuit point 44 and its output to the S input of the flip flop 48 via the NOT circuit 50. The Q output of the flip flop 48 is connected to the OR gate 40 via another NOT circuit 90, besides being connected to the NAND gate 52. The R input of the flip flop 48 is connected to the AND gate 57 as in the FIG. 1 disk drive 10.

The disk sensor circuit 36b operates in two different modes depending upon whether the Q output of the flip flop 48 has been low or high at each transition of the POWER SAVE signal from its nonpower saving to power saving period. Such different modes of operation will be discussed hereafter with reference to FIGS. 5 and 6.

Figure 5:
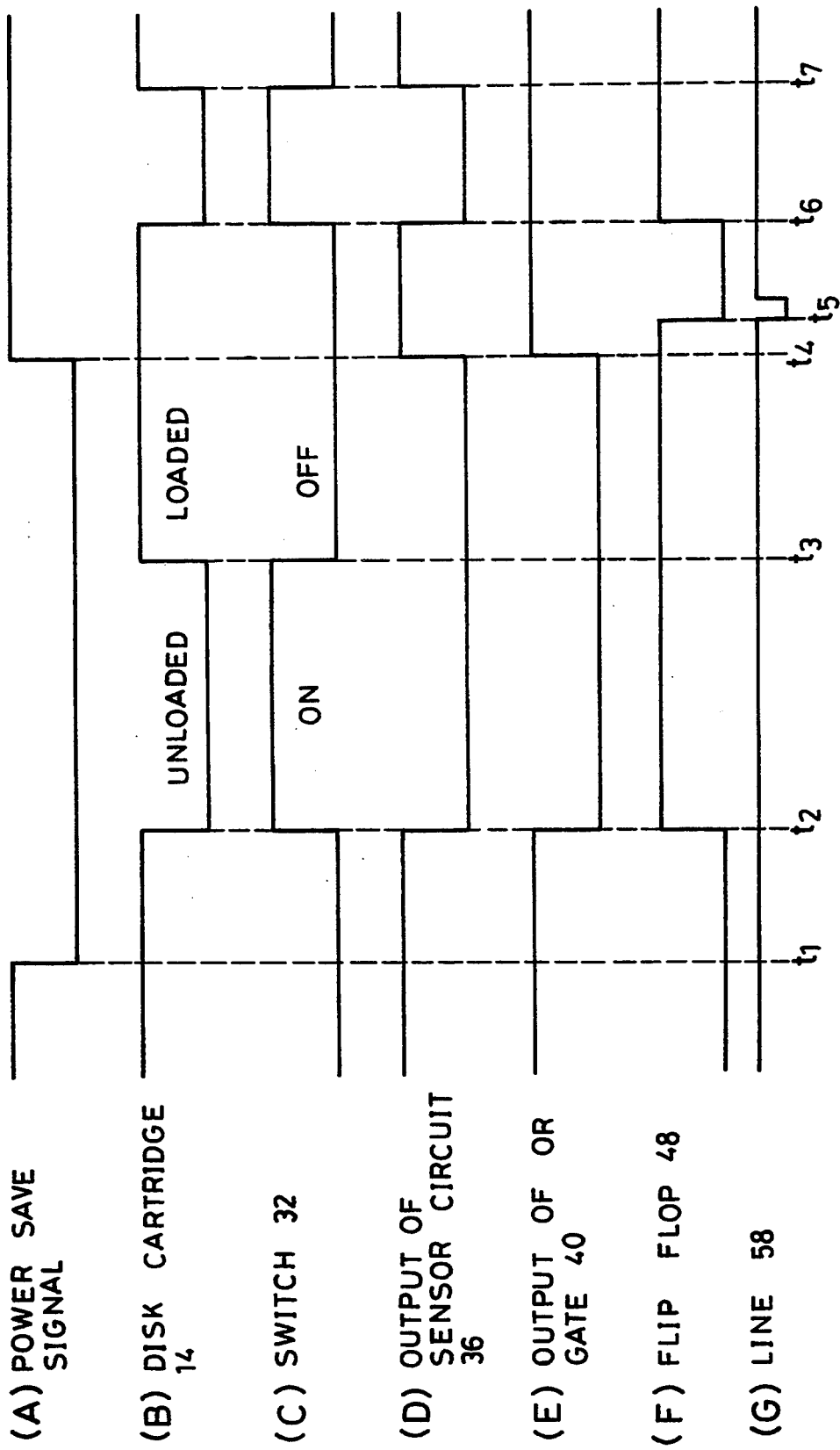
FIG. 5, consisting of (A) through (G), is a timing chart explanatory of one mode of operation of the FIG. 4 power saving system.

FIG. 5 is explanatory of the operation of the disk sensor circuit 36b in the case where the Q output of the flip flop 48 has been low, as at (F) in this figure, until the transition, at time $t_1$, of the POWER a SAVE signal from its nonpower saving to power saving period. Inputting the inversion of this low output from the flip flop 48, the OR gate 40 has been high until the time $t_1$, as at (E) in FIG. 5. Therefore, even if the POWER SAVE signal goes low at the time $t_1$, the OR gate 40 will remain high, so that the flip flop 48 will remain low.

The OR gate 40 will remain high until the subsequent time $t_2$ when the disk cartridge is unloaded, as at (B) in FIG. 5, with the consequent closure of the sensor switch 32 as at (C) in the same figure. Since then the circuit point 44 becomes grounded, the flip flop 48 will go high whereas the OR gate 40 will go low and remain so until time $t_4$ when the POWER SAVE signal goes high. Thus no current will flow through the resistor 38 during the $t_2$–$t_4$ period.

Figure 6:
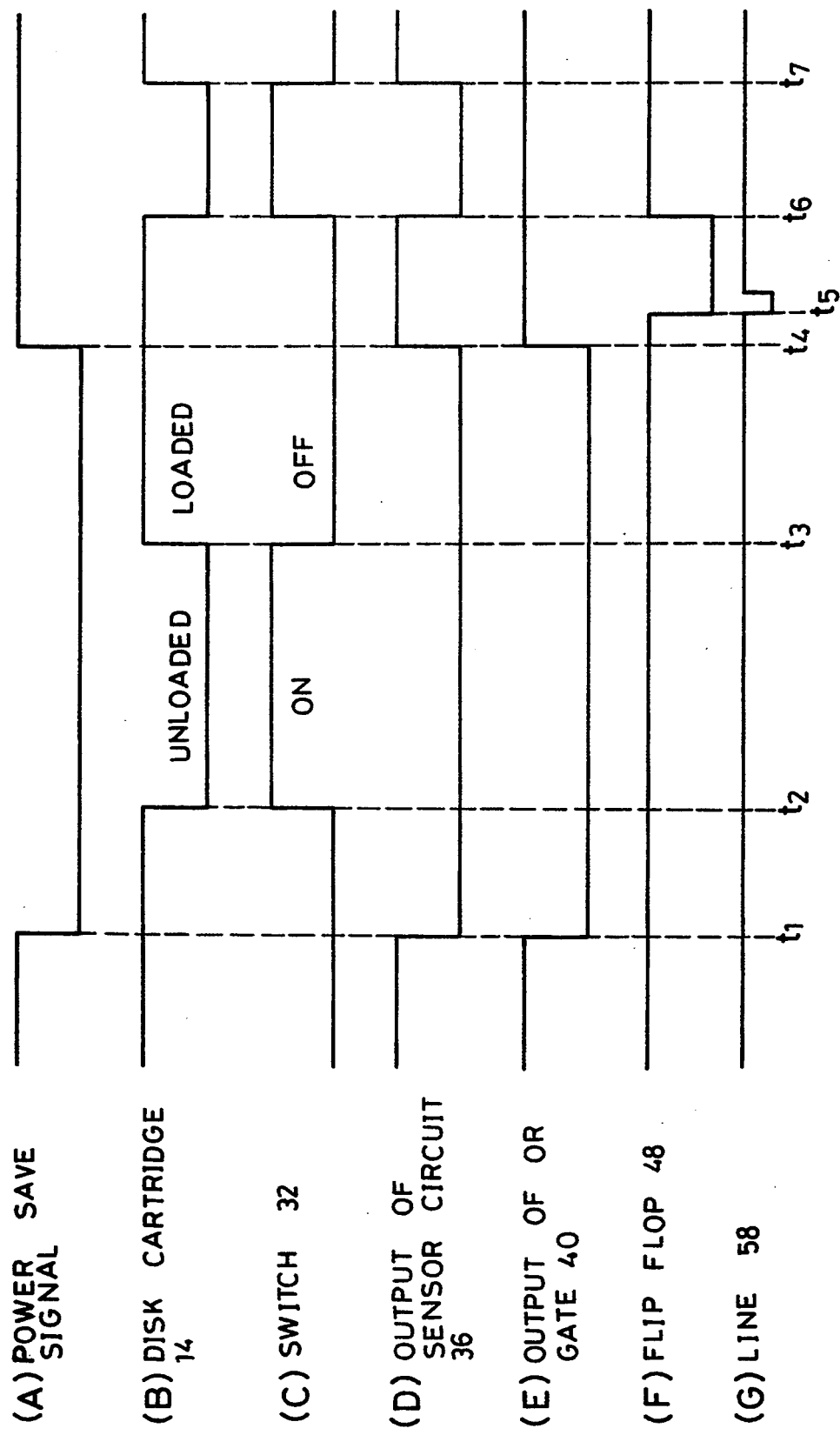
FIG. 6, consisting of (A) through (G), is a timing chart explanatory of another mode of operation of the FIG. 4 power saving system.

On the other hand, in the case where the Q output of he flip flop 48 has been high until the time $t_1$, as indicated at (F) in FIG. 6, then the OR gate 40 will go low at this time when the POWER SAVE signal goes low. The OR gate 40 will remain low when the disk cartridge is unloaded at the time $t_2$, with the consequent closure of the sensor switch 32, because then the flip flop 48 will remain set. Thus the OR gate 40 will remain low until the time $t_4$, so that no current will flow through the resistor 38 during the $t_1$–$t_4$ time interval in this case. The operation of the disk sensor circuit 36b after the time $t_4$ in both cases is the same as that of the FIG. 1 embodiment set forth with reference to FIG. 2.

Fourth Form

Figure 7:
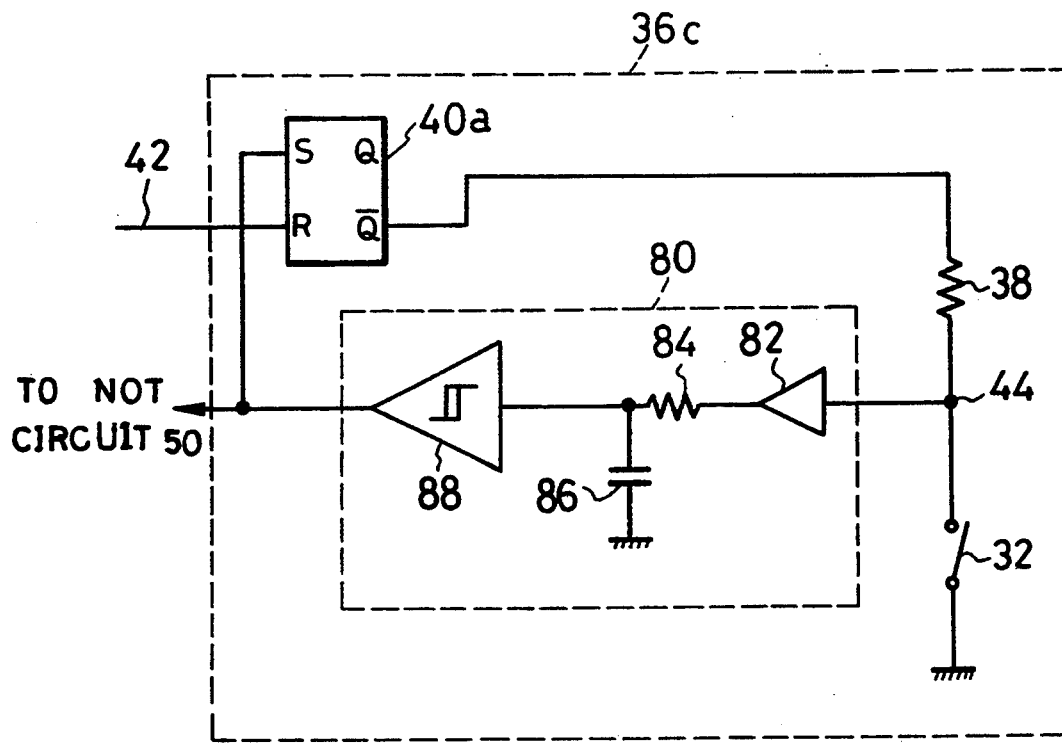
FIG. 7 is a schematic electrical diagram of still another modified disk sensor circuit.

The fourth form of disk sensor circuit 36c shown in FIG. 7 is similar to the FIG. 3 circuit 36a except that the former employs an RS flip flop 40a in lieu of the OR gate 40 in the latter. The flip flop 40a has its S input connected via the noise suppressor circuit 80 to the circuit point 44 between sensor switch 32 and resistor 38, its R input to the POWER SAVE line 42, and its Q output to the resistor 38. The operation of this disk sensor circuit 36c is therefore similar to that of FIG. 1 or 3. The flip flop is considered a type of logic gate for the purposes of the invention.

Fifth Form

Figure 8:
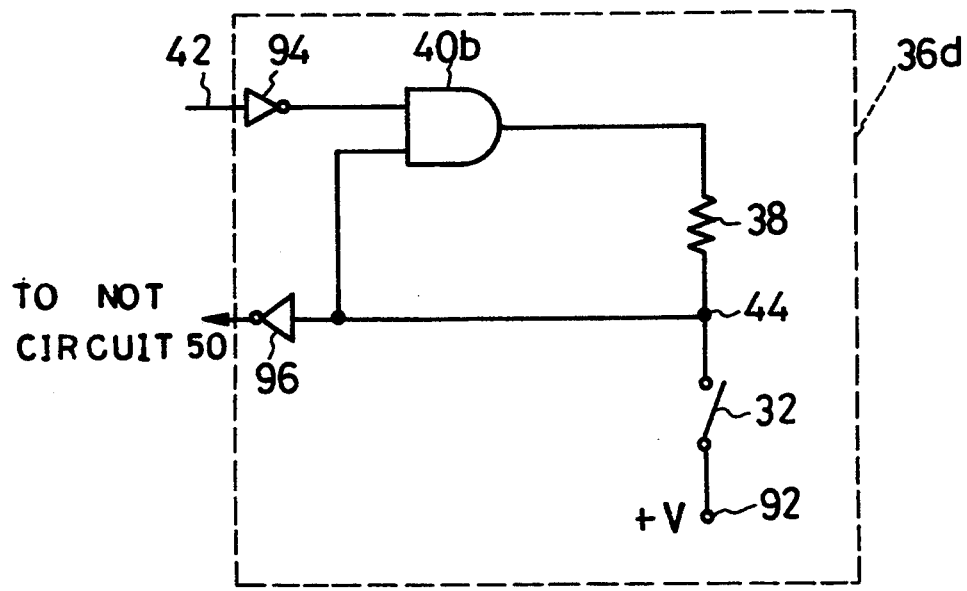
FIG. 8 is a schematic electrical diagram of yet another modified disk sensor circuit.

In the fifth form of disk sensor circuit 36d shown in FIG. 8, the OR gate 40 of the FIG. 1 sensor circuit 36 is replaced by an AND gate 40b, and the sensor switch 32 is connected to a supply terminal 92 instead of being grounded as in all the foregoing embodiments. The AND gate 40b has one of its two inputs connected to the POWER SAVE line 42 via a NOT circuit 94, and the other input to the circuit point 44. This circuit point is further connected to another NOT circuit 96 which in turn is connected to the flip flop 48, FIG. 1, via the NOT circuit 50, in order that the flip flop may provide the same signal as shown at (F) in FIG. 2.

The AND gate 40b is high when the POWER SAVE signal is high, as from time $t_1$ to time $t_4$ in FIG. 1. When the disk cartridge is unloaded, and the sensor switch 32 closed, as at time $t_2$ in FIG. 1, the supply voltage from the terminal 92 will not flow through the resistor 38 because the AND gate 40b is still high. The AND gate 40b will remain high when the sensor switch 32 is opened upon unloading of the disk cartridge at time $t_3$, and remain so until the POWER SAVE signal goes high at time $t_4$. Thus, in this FIG. 8 circuit 36d, too, no power will be consumed during the $t_2$–$t_4$ time interval. The other details of operation are as previously set forth with reference to FIGS. 1 and 2.

Possible Modifications

Although the present invention has been shown and described in the foregoing in very specific aspects thereof, it is not desired that the invention be limited by the exact details of such disclosure. The following, then, is a brief list of possible modifications, alterations and adaptations of the illustrated embodiment which are all believed to fall within the scope of this invention:

1. The POWER SAVE signal, which might be either supplied from the host or generated within the disk drive, could be high to indicate a power saving period, and low to indicate a nonpower saving period.
2. The OR gate 40 could be replaced by other logic circuits such as, for example, a combination of a NAND gate and two NOT circuits, with one of the two inputs of the NAND gate connected to the POWER SAVE line via one NOT circuit, and the other input connected to the circuit point 44 via the other NOT circuit.
3. The flip flop 48 of the FIG. 4 disk sensor circuit 36b could have its Q output connected directly to the OR gate 40, instead of having its Q output connected to the OR gate via the NOT circuit 90. Also, the flip flop could be of other known type, or independent trigger circuits could be provided on the preceding stages of its inputs.
4. The invention could be applied to optical disk drives.

What is claimed is:

1. In an apparatus for data transfer with a rotating data storage disk to be loaded in and unloaded from the apparatus, a power saving system comprising:
   (a) power save signal means for providing a power save signal indicative of whether the apparatus is active or inactive;
   (b) disk sensor means for sensing whether the data storage disk is loaded in or unloaded from the apparatus, the disk sensor means comprising a sensor switch to be opened or closed depending upon whether the data storage disk is loaded in or unloaded from the apparatus, and a resistor having a first extremity connected to the sensor switch, the sensor switch being connected between the resistor and either a ground or a supply terminal; and
   (c) power supply means for holding the disk sensor means powered at least when the apparatus is active, and for unpowering the disk sensor means when the disk is unloaded while the apparatus is inactive, the power supply means comprising a logic gate having a first input connected to the power save signal means, a second input connected to a circuit point between the sensor switch and the resistor of the disk sensor means, and an output connected to a second extremity of the resistor.

2. The data transfer apparatus of claim 1 further comprising a disk withdrawal signal means connected to the circuit point between the sensor switch and the resistor of the disk sensor means for providing a disk withdrawal signal indicative of the unloading of the disk at least while the apparatus is active.

3. The data transfer apparatus of claim 2 wherein the disk withdrawal signal means comprises a bistable circuit to be switched into one state by an output from the disk sensor means, and into another state by a stepping pulse.

4. The data transfer apparatus of claim 1 wherein the output of the logic gate of the power supply means is grounded via the resistor and the sensor switch of the disk sensor means.

5. The data transfer apparatus of claim 4 wherein the logic gate of the power supply means is an OR gate.

6. The data transfer apparatus of claim 4 wherein the logic gate of the power supply means is a flip flop.

7. The data transfer apparatus of claim 1 wherein the output of the logic gate of the power supply means is connected to a positive supply terminal via the resistor and the sensor switch of the disk sensor means.

8. The data transfer apparatus of claim 7 wherein the logic a gate of the power supply means is an AND gate.

9. The data transfer apparatus of claim 1 further comprising a noise suppressor circuit connected between the circuit point between the sensor switch and the resistor of the disk sensor means and the second input of the logic gate of the power supply means.

10. The data transfer apparatus of claim 1 further comprising:
   (a) a flip flop having a set input connected to the circuit point between the sensor switch and the resistor of the disk sensor means, and an output connected to the second input of the logic gate of the power supply means; and
   (b) resetting means connected to a reset input of the flip flop.

11. The data transfer apparatus of claim 10 further comprising a noise suppressor circuit connected between the circuit point between the sensor switch and the resistor of the disk sensor means and the set input of the flip flop.

* * * * *